United States Patent Office 3,052,106
Patented Sept. 4, 1962

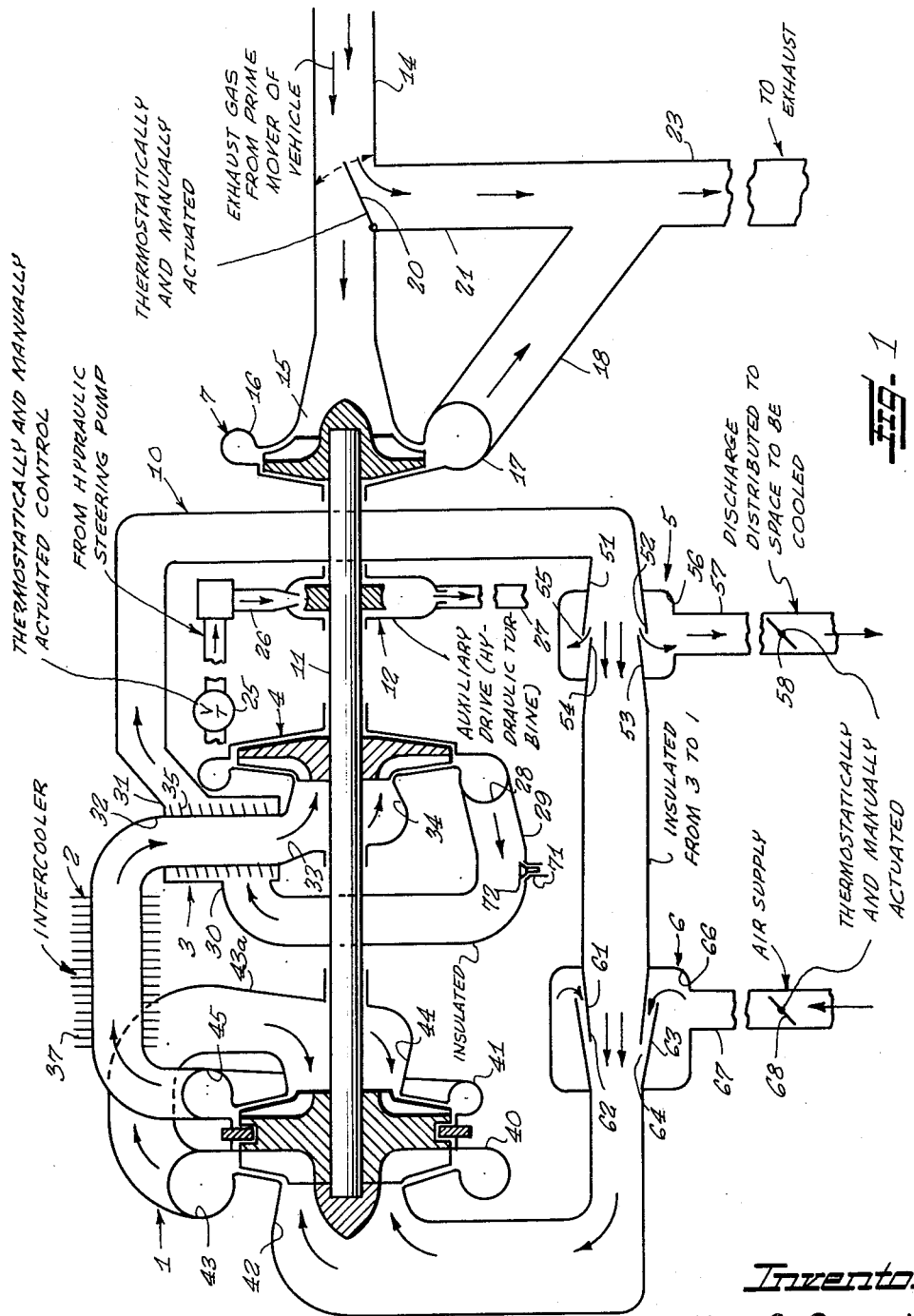

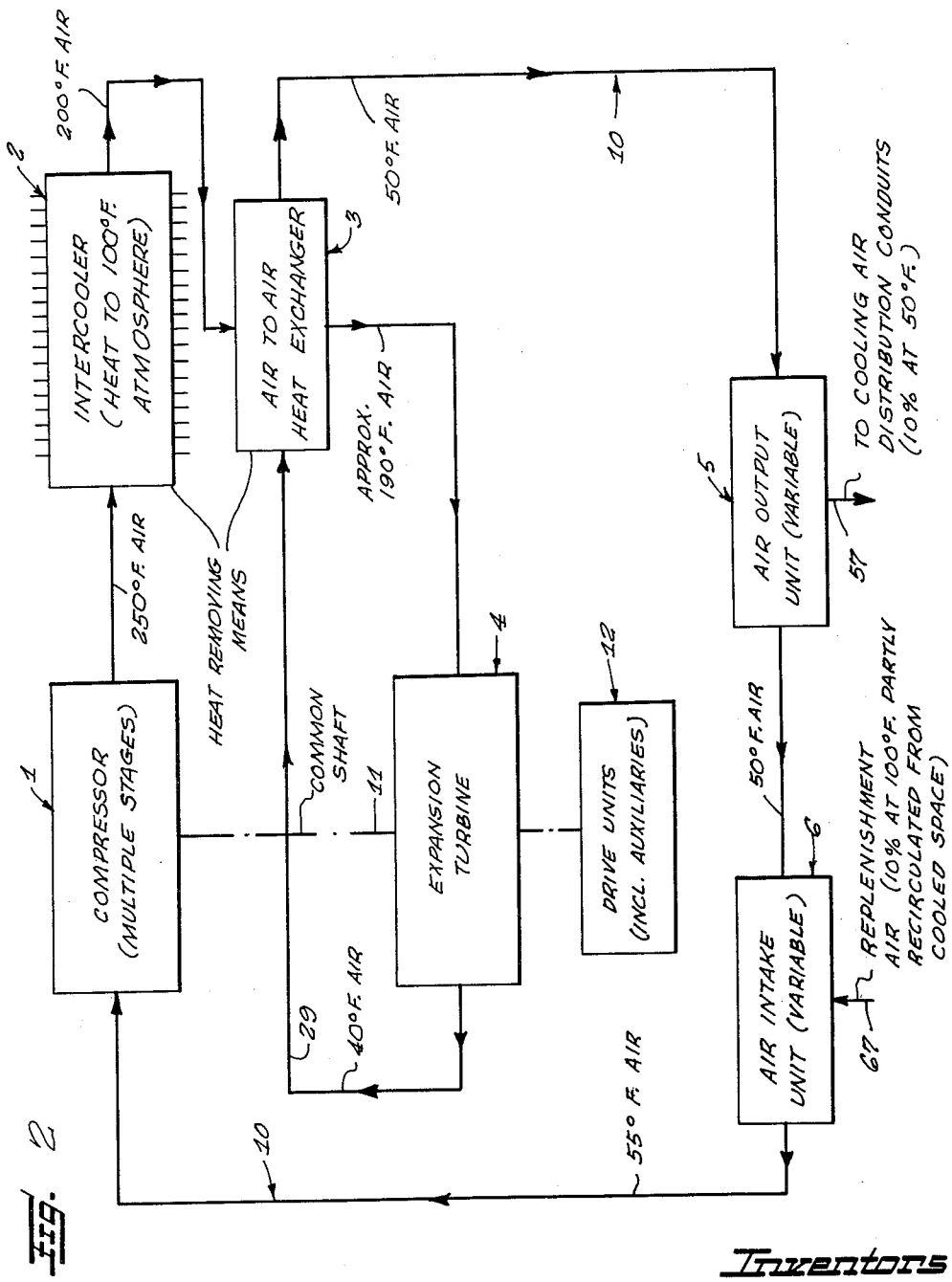

3,052,106
AIR COOLING SYSTEM
Achilles C. Sampietro, Birmingham, Mich., and James E. Yingst, Euclid, Ohio, assignors to Thompson Ramo Wooldridge Inc., Cleveland, Ohio, a corporation of Ohio
Filed May 19, 1960, Ser. No. 30,106
7 Claims. (Cl. 62—402)

This invention relates to gas cooling systems and more particularly to a recirculating type air cycle refrigeration system for cooling and ventilating a chamber for human occupancy such as that of a vehicle wherein the recirculating air cooling apparatus is driven by a turbine powered by exhaust gas from the vehicle prime mover.

Various types of closed and open air cycle refrigeration systems and methods have previously been proposed, but they have had various and serious disadvantages. Closed systems are too inefficient and bulky. While the usual open air cycle refrigeration system can be made to be quite small and light, particularly if it employs a high speed turbo-compressor, yet its efficiency is quite low or nearly one half of that of a vapor compression unit. Further, in cooling the chamber for human occupancy, the very large amount of air supplied by the usual open cycle air system or the high velocity of this air often causes material discomfort. It is also difficult, and often impractical to properly dehumidify the cooled air in such an open system.

According to the present invention, the small size and light weight of the previously known open air system are retained or bettered and disadvantages of previously proposed air systems are removed or reduced by our system wherein the supplied cold air is only a small or minor portion of the continuously recirculated body of air in the present system. In our system the cooled air is not discharged at the lowest temperature of the cycle. This dehumidifies the discharged air. Put another way, the efficiency of our system is increased by having the cycle operate through a wider temperature range.

In one particular form of our invention, a body of air is continuously recirculated and compressed by a high speed and small size turbo-compressor which is preferably of the multi-stage type and direct drive type, or on a common shaft with a coaxial exhaust gas turbine supplied from any suitable source such as a vehicle prime mover. This prime mover may be a reciprocating engine or it may be a gas turbine, in which case it may be tapped between its several stages to supply the exhaust gas as will be understood by those skilled in this art.

The air thus compressed (wholly or partially as between the air compressor stages) has heat removed therefrom by a suitable heat exchanger means. Part of this heat is rejected, as to the outside atmosphere. The compressed air is then expanded in a motor unit to help drive the compressor and preferably in a turbine coaxially connected on the same shaft with the compressor. Thus the turbine does useful work in helping to drive the compressor.

The vehicle prime mover exhaust gas turbine is connected on the same shaft with the turbo-compressor in the preferred form of our invention. The expanded air portion of the mostly closed recirculation circuit has an air discharge means and an air supply means opening into it. Both handle only a small fraction (about 10% in a preferred embodiment) of the total body of recirculated air in this mostly closed circuit. The discharged expanded and cooled air is suitably conducted to a space to be cooled, such as the passenger compartment of a vehicle. The supply or replenishment air to the recirculation circuit may be all or in part from the same passenger compartment or it may be all from outside if a greater rate of fresh air supply is desired in ventilating said compartment.

An important feature of our invention, is that only a part of the heat removed from the compressed recirculated air is returned to the expanded air, as by a suitable heat exchanger. This returned heat slightly raises the temperature (or partially reheats) at least the expanded and chilled air to be supplied to the space to be cooled. This reheating also lowers the relative humidity of this discharged air. Further, since the discharged air is not at the lowest temperature in the cycle, the absolute humidity or water content of the discharged air is reduced.

The operation of this system as to its temperature, relative humidity, and the ventilating fresh air percentage may be controlled and regulated by several different means which may include any suitable or conventional manually adjustable and thermostatically actuated control system to automatically regulate the temperature of the space to be cooled as by actuating a control valve for the supply or pressure of the available exhaust gas for the driving gas turbine. In cases where the driving exhaust gas supply is variable, as when it is from a vehicle prime mover, an auxiliary driving means may be employed and automatically brought into action by the automatic regulating system as will be understood by those skilled in this art. The amount and the percentage of the withdrawn cooled air, as well as the air returned to the system may also be manually regulated or controlled automatically by the thermostatic control system. It is to be understood that while the invention of the present system is preferably used for air, yet it may be usefully employed for various other gases and the description and claims hereof are intended to be generic thereto.

Accordingly, it is a general object of this invention to provide an improved and more efficient air cycle cooling apparatus of the partly open but recirculating type.

Another object of this invention is to provide an air cycle refrigeration apparatus, especially useful for cooling and at least in part ventilating a space for human occupancy, wherein the absolute humidity of the chilled air supplied is materially reduced.

Still another object of this invention is to provide a very compact and high speed air cycle cooling apparatus which has a high efficiency and is suitable for ventilation as well as cooling spaces for human occupancy.

A further object of this invention is the provision of an improved vehicle passenger compartment ventilation and cooling system or apparatus in which the exhaust gases from the vehicle prime mover drive a gas turbine preferably forming a single rotary unit with a turbo-compressor and an expansion turbine.

Additional objects hereof are to be found in the provision of improved controls and regulating means for apparatus of the aforesaid types including independently adjustable regulators for the supply air and for the discharged air and control means for the driving exhaust gas to regulate the entire cooling output.

Still further objects of this invention are to provide an only partially open air cycle refrigeration system of the aforesaid type having improved air supply and improved air intake means requiring no moving parts for their operation.

Other objects, features and advantages of this invention will become more fully apparent to those skilled in this art from the following general description of this invention and from the detailed description of the exemplary form shown in the drawings.

FIGURE 1 is a schematic view showing the cooling system of this invention with all of the several units and parts thereof illustrated as though they were in a single plane and with certain of the relative sizes and arrangements being chosen for clarity of the illustration and not necessarily indicating the actual physical sizes and precise arrangements; and FIGURE 2 is a block diagram schematically showing the same general system as illustrated in FIGURE 1 particularly in terms of the heat flow as well as the air flow.

It will be understood by those skilled in this art, and no further or more detailed illustrations of the particular preferred arrangements will be necessary for those so skilled, that the illustrated relative sizes, levels, and relative positions (except insofar as they are indicated and as material to the heat and air flow circuits) are schematic in the two figures hereof and are not intended to be limiting or specific as to the actual apparatus. Suitable precise forms will be understood by those skilled in this art.

In the exemplary embodiment schematically illustrated in FIGURES 1 and 2, the system is shown and intended to be part of a vehicle passenger compartment's cooling and ventilating means, to be driven by exhaust gas from the vehicle's prime mover, all as indicated by the legends in the figures. It will, of course, be understood that various other suitable drive means may be employed and that the present invention may be employed for other cooling purposes including the use of other gases than air.

The system of this invention comprises a substantially closed or only partly open loop or circuit designated as a whole by 10 and providing a recirculation path for the air or other suitable gas employed. This path comprises suitable passages or conduits to connect the several parts including the turbo-type rotary air compressor designated as a whole by 1, the following intercooler designated as a whole by 2, the heat exchanger designated as a whole by 3, the expansion turbine designated as a whole by 4, the air discharge unit designated as a whole by 5, the air intake unit designated as a whole by 6, and the other and more detailed parts as hereinafter described.

Power is supplied into this system by suitable means, such as the prime mover exhaust gas turbine designated as a whole by 7. This turbine is preferably, but not necessarily, coaxial with, and connected to the common shaft 11, to which is also secured the compressor 1, the turbine 4, and the auxiliary drive unit designated as a whole by 12.

As shown, the gas turbine 7 may be driven by the exhaust gases from any suitable source such as the prime mover of the reciprocating engine or turbine prime mover for the vehicle to be cooled. These gases are supplied through suitable passage such as pipe 14 which leads into the center or throat 15 of the generally radial flow type turbine 7 whose outer scroll 16 leads into an enlarged outlet portion 17. From thence, the expanded exhaust gases are carried as by a suitable conduit 18 back into the main discharge pipe 23 which has a parallel or bypass connection to the exhaust gas supply, such as on the portion 21. The supply or the operating pressure of these exhaust gases are suitably regulated, as by the throttling or regulating valve 20, controlling the by-pass of the exhaust gases as will be understood by those skilled in this art.

As will be similarly understood this regulating valve 20 or its equivalent may be manually actuated. However it is preferably automatically actuated either directly or by a relay from the hereinafter described automatic thermostatically regulating system. It thus controls the desired lowered temperature of the passenger compartment of the vehicle or the like which is to be cooled and ventilated by the apparatus of this invention.

It is to be understood that various other rotatable input or output means may be mounted on, or connected to, this same common shaft 11 within the purview of this invention since it is desired that the apparatus have only one main rotating part, where possible.

The auxiliary drive means 12 may be of any suitable or known type compatible with the relatively high rotative speeds desired here and conveniently supplied with power from the vehicle. This auxiliary may be a high speed electric motor powered from the vehicle battery. Preferably, and as illustrated herein, this auxiliary driving means is a small and high speed hydraulic turbine powered by the hydraulic system of the vehicle, such as the hydraulic steering power supplying pump in the case of an automobile. As shown, the supply or inlet to this auxiliary drive is controlled by a variable throttle valve marked VT designated by 25 and controlling the flow of liquid through the intake supply pipe 26 into the turbine unit from which it discharges into a return passage 27. It is to be understood that the valve 25 will be automatically opened to the necessary degree as by the above noted thermostatic and automatic regulating system. This brings the auxiliary drive 12 into operation when the cooling output or the speed of the common rotor unit falls below the level demanded by the thermostat in the compartment to be cooled for any reason and particularly due to too small a supply or pressure of exhaust gas at 14, which will occur when the prime mover is off or idling.

The scroll of the expansion turbine 4 has an enlarged discharge portion 28 communicating with a suitable passage schematically shown at 29 and leading into the entrance 30 of the outer or jacket portion of the heat exchanger 3. As indicated by the legend, conduit 29 is preferably insulated between 28 and 30 to prevent unwanted loss of heat to the surrounding atmosphere. For the same reasons, the conduit portions of circuit 10 are preferably insulated from the discharge from heat exchanger 3 at 31 to the entrance 42 of the first stage of the compressor 1.

As shown, the inner passage of the heat exchanger 3 may be finned as indicated at 35. The compressed air enters the inner passage of heat exchanger 3 at the entrance portion 32 and leaves at the entrance portion 33 from which it is led into the entrance 34 of the expansion turbine 4. The intercooler 2 has suitable means to reject heat from the system such as the fins 37 to be cooled by the outer atmosphere. It will be understood that suitable means to move air through these fins may be used.

The compressor 1 is shown as having two stages 40 and 41 although it will be understood that a greater number of stages may be employed in certain cases. The air being compressed leaves the first stage 40 from the enlarged portion 43 of its scroll and by the suitable conduit connection 43a enters the enlarged and central entrance 44 of the second stage. It leaves the scroll of the second stage at the enlarged portion 45 to enter the intercooler 2.

Discharge unit 5 is preferably of the type not requiring any moving parts. It is also adjustable or regulatable to vary the amount of chilled air supplied from the expanded air portion of the circuit 10. As shown, the unit 5 comprises the expanding entrance portion or cone 51 to reduce the velocity of the air at the throat portion. The downstream end 52 of this cone is of a larger diameter and ends at about the same axial point as, the upstream or entrance end of the inner conical section 53. Upstream end 54 of the inner member defines with 52 the upstream facing annular slot 55. Thus the velocity pressure of the circulating air is efficiently transformed into pressure and into velocity in the surrounding chamber 56 and led off by a suitable conduit 57 to the space or compartment to be cooled and ventilated. It will be understood that the velocity and pressure energy in conduit 57 is sufficient to deliver this chilled air through the required length of conduit 57 and its required branches and discharge grilles or the like. The amount of air leaving the system from unit 5 may be variably controlled or regulated as by a suitable control valve indicated by the butterfly type throttling valve 58. It will be understood that valve 58 is intended to be both manually and thermostatically or automatically actuated as will be understood by those skilled in this art.

The air intake unit 6 is shown as being downstream from unit 5. While this is the preferred arrangement it is to be understood that the air intake may be built into a common unit with the air discharge device or it may be upstream therefrom within the broader purview of this invention.

Since unit 6 is intended to produce an oppositely directed velocity and a suction instead of the pressure of unit 5, it will be understood that the arrangement in the unit 6 is in many respects the opposite of that of unit 5. Accordingly, unit 6 (which also has no moving parts) may be considered as constituting a venturi to produce a suction of the desired amount to supply a regulated amount of air into the recirculating system. Accordingly the conical entrance portion or cone 61 has its smaller and downstream end 62 arranged to increase the velocity, and hence the suction, at the throat. This inner portion 61 is embraced within a substantial axial length of the outer conical portion 63 to provide the annular slot or opening 64 providing a venturi suction in the outer casing 66 communicating with the conduit 67 to supply the required amount of air into the system.

It is to be understood that in certain cases all of the air into unit 6 may be returned from the space or compartment to be cooled. In other cases only part of the return air is from the compartment to be cooled and the rest may be fresh or outside air. It is also to be understood that where a maximum degree of fresh air ventilation is desired, all of the return air may be from the outside, although this requires a greater amount of cooling or refrigerating capacity.

It is also to be understood that the amount of return air is regulated by the butterfly type control or throttling valves 68 and valve 58 may be manually or thermostatically actuated. Alternatively, valves 68 and 58 may be independently or differentially actuated. This last permits a selective or variable control of the pressure or actual weight of air in the system as will be understood by those skilled in this art.

Referring to the system as a whole and its operation, it will be seen that heat in a desired amount, is removed from the compressed air between the compressor 1 and the expansion turbine 2 by suitable heat exchanger means, here comprising the intercooler 2 and the heat exchanger 3. It will be understood that these two heat exchange means may be combined or may be of various other suitable forms or arrangements to achieve the purposes of this invention. Thus the major part of the heat removed is dissipated to the outside air by the intercooler 2. Only a smaller part of the heat removed from the compressed air is transferred by the heat exchanger 3 into the expanded air. This, in effect, by-passes the expansion turbine 4. It is desired that this by-passed heat (or this reheating of the expanded air) be applied in such fashion that it at least heats the expanded air discharged out through unit 5 or through the discharge conduit 57.

It is also to be noted that the air discharged or withdrawn from the system is not taken at the lowest temperature point of the system. Accordingly the absolute humidity or the water content of the discharged air will be materially lower than that of the entering air at unit 6. Suitable means may be provided to remove water collected in the coldest part of the system, which is at the lowest point between the discharge 28 of the expansion turbine 4 and the intake 30 of the heat exchanger 3. Such removal means is schematically indicated by a drain opening and passage 71 closed except when needed so by the float valve 72. Those skilled in this art will understand that other suitable means may be employed for this purpose.

The flow and block diagram of FIGURE 2 will aid in the understanding of the temperature changes, heat flow, and the air flow of this system and its related method. In the one example chosen, it is to be understood that the values of temperature are only approximate and are given for purposes of illustration.

Accordingly it is here assumed that unit 5 discharges about 10% of the total body of air circulating around the otherwise substantially closed or recirculating circuit 10. Put another way and on the average, air entering through the unit 6 will circulate an average of ten times before leaving through the discharge unit 5. It will be understood that this recirculation materially increases the efficiency, particularly by permitting the system to operate through a larger temperature range. This system or method supplies the air from the discharge unit 5 at a desired and comfortable temperature for a human occupied chamber.

Accordingly it is assumed that approximately the same percentage, that is 10% of the total body of air, is taken in at the intake unit 6 at a temperature of 100° F. This then increases the temperature of the recirculating and expanded air from approximately 50° F. to 55° F. as indicated by the legends on FIGURE 2. This 55° air is compressed and heated to 250° F. at which temperature it enters the intercooler 2 to reject heat to the 100° F. atmosphere. It is assumed that the air is thus cooled from approximately 250° F. to approximately 200° F. This 200° F. and compressed air enters heat exchanger 3 to give up heat to the expanded air as shown. Accordingly this compressed and 200° F. air is assumed in this particular example to be cooled to approximately 190° F. in heat exchanger 3 thus raising the temperature of the expanded air from passage 29 from 40° F. to 50° F. at which temperature it is supplied to the space to be cooled. As noted above, it is to be understood that the use of other gases than air is intended under the broader aspects of this invention even though the description and certain of the claims describe the gas as air.

It is also to be understood that various other arrangements, forms or modifications may be employed under the teachings of this invention and without departing from the spirit and scope of the novel concepts thereof.

We claim as our invention:

1. A cooling system comprising:
   (a) a recirculation circuit for a body of gas including
   (b) gas compressing and gas expanding means,
   (c) drive means therefor,
   (d) means in said circuit to remove heat from said compressed gas and to return only a part of said heat to said gas expanded by said expanding means to partially reheat said expanded gas,
   (e) means to supply only a part of said expanded and partially reheated gas from said recirculation circuit to a space to be cooled and to supply replenishing gas into the expanded gas of said recirculation circuit.

2. A cooling system comprising:
   (a) a recirculation circuit for a body of gas including
   (b) gas compressing and gas expanding means wherein the expansion helps power the said compression,
   (c) drive means therefor,
   (d) heat exchange means in said circuit to remove heat from said compressed gas and return only a part of said heat to at least part of said heat to at least part of said gas expanded by said expanding means to partially reheat said expanded gas and
   (e) means to supply only a part of said expanded and partially reheated gas from said recirculation circuit to a space to be cooled, to supply replenishing gas into the expanded gas of said recirculation circuit and to adjustably vary the amount of gas supplied to said space to be cooled and the relative amount of said gas supplied into the expanded gas of said recirculation circuit.

3. An air cooling and ventilating apparatus comprising:
   (a) a recirculating circuit having intake and outlet means to take in warm air, recirculate it therethrough for an average of a plurality of times, and discharge it as chilled air to a space to be cooled and ventilated, (b) said circuit also including compressor means having a drive means, (c) a connected air expansion motor means to help drive said compressor means, (d) and heat exchange means to remove heat from said compressed air and return only a part of said removed heat back to said expanded air whereby at least the discharged air is partially reheated.

4. An air cooling and ventilating apparatus comprising:

(a) a recirculating circuit having intake and outlet means to take in warm air, recirculate it therethrough for an average of a plurality of times, and discharge it as chilled and dehumidified air to a space to be cooled and ventilated, (b) said circuit also including a turbo-compressor having a connected drive means, (c) an air expansion turbine coaxial and on a common shaft with said turbo-compressor to help drive it and (d) heat exchange means to remove heat from said compressed air and return only a part of said removed heat back to said expanded air whereby at least the discharged air is partially reheated and is dehumidified, (e) said apparatus having only a single unitary rotating member comprising a common shaft having said turbo-compressor, said expansion turbine, and said drive means thereon.

5. (a) a recirculating circuit for a gas, (b) a turbo-compressor therein to heat and compress said gas, (c) an expansion turbine thereafter to expand and cool said gas, (d) drive means connecting said turbine to help drive said compressor, (e) heat exchanger means to cool said compressed gas by removing heat from the system and also by transferring heat from said compressed gas to said expanded gas to partially reheat it, and (f) means to supply only a small fractional part of said partially reheated but cooled and expanded gas to a space to be cooled and to return replenishing gas to said recirculating circuit.

6. In a vehicle having a fuel burning prime mover with expansion energy in its exhaust gas, (a) a combined cooling, ventilating, and dehumidifying system for a passenger compartment of said vehicle comprising:

(1) a recirculating circuit for a body of air, (2) a driving gas turbine on a shaft using the vehicle prime mover exhaust gas, (3) a turbo-compressor on said shaft and in said circuit, (4) an expansion air turbine on said shaft and in said circuit after said compressor and (5) means opening into the expanded air portion of said recirculation circuit for replenishing intake and for discharge of only a small portion of the chilled recirculated air to a passenger compartment of said vehicle, (b) said system and circuit including means to reject heat from said recirculated air while compressed and to reject part of said heat to the outside atmosphere and to return only part of said heat to said air while it is expanded to thereby partially reheat and lower the humidity of said chilled air discharged to said passenger compartment.

7. A gas cooling system which comprises:

(a) gas compressor means, (b) means connected to receive gas from said compressor means and providing (c) an intercooler to reject heat from the system and (d) a heat exchanger, (e) turbine means connected to receive gas from said compressor means to expand said gas and lower its temperature and also connected to help drive said compressor means, (f) connection means for conducting said expanded, cooled gas through said heat exchanger to only partially reheat it, (g) means for flowing only a small part of said cooled but partially reheated gas to a space to be cooled, (h) means for supplying replenishing gas back into said system and (i) means associated with at least one of said last two means to adjustably vary one of said small part of said gas supplied to said space to be cooled or the pressure of said recirculating gas.

References Cited in the file of this patent

UNITED STATES PATENTS

| | | |
|---|---|---|
| 2,409,159 | Singleton | Oct. 8, 1946 |
| 2,557,099 | Green | June 19, 1951 |
| 2,585,570 | Messinger | Feb. 12, 1952 |
| 2,614,815 | Marchant | Oct. 21, 1952 |
| 2,618,470 | Brown | Nov. 18, 1952 |
| 2,628,482 | Burgess | Feb. 17, 1953 |
| 2,800,002 | Seed | July 23, 1957 |